Aug. 16, 1949.  A. W. GAIR  2,479,339
STEERING LINKAGE
Filed March 4, 1946
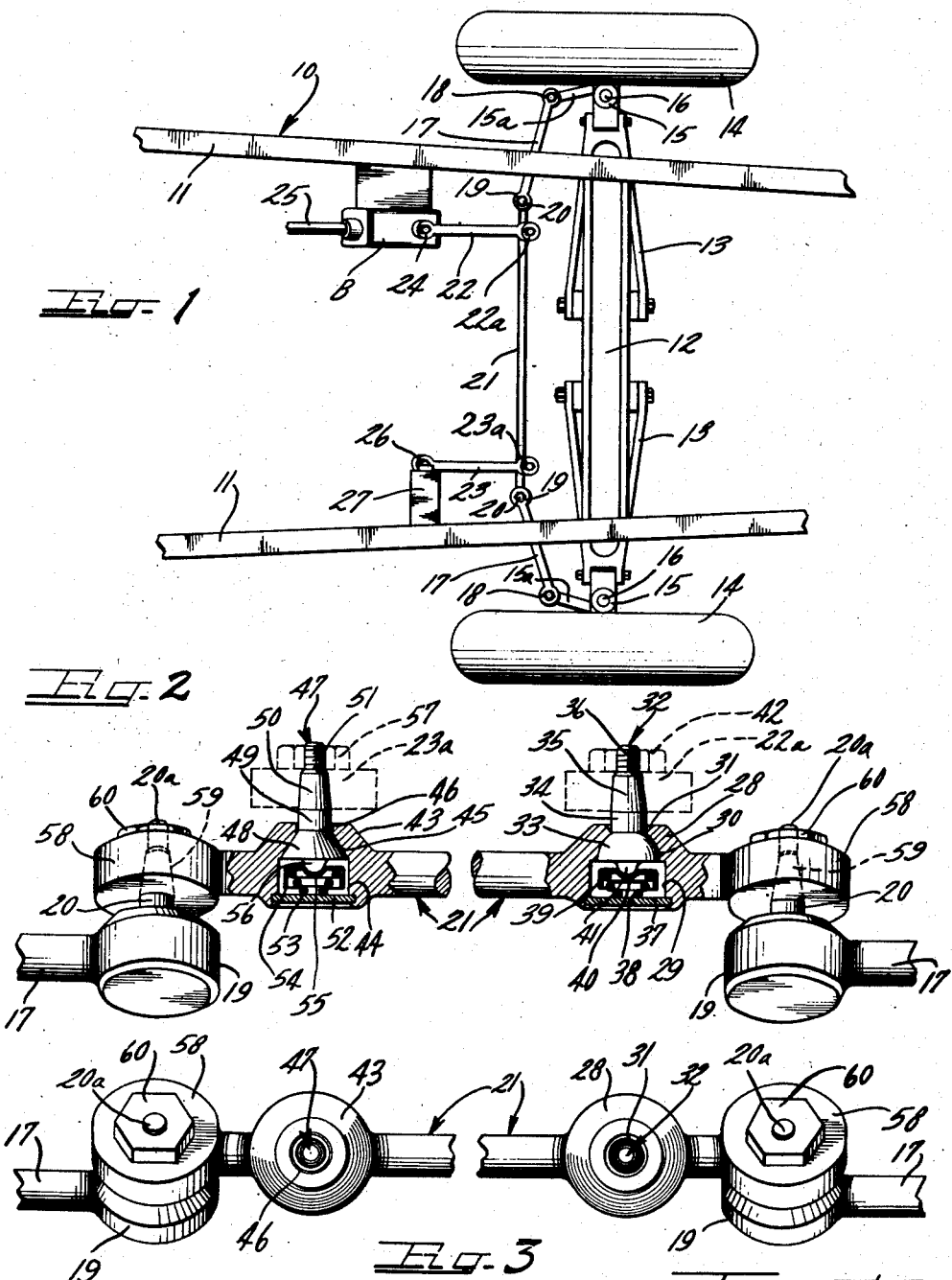
Inventor
ALBERT W. GAIR
by The Firm of Charlesworth Attys.

Patented Aug. 16, 1949

2,479,339

UNITED STATES PATENT OFFICE 2,479,339

STEERING LINKAGE

Albert W. Gair, Detroit, Mich., assignor to Thompson Products, Inc., Cleveland, Ohio, a corporation of Ohio Application March 4, 1946, Serial No. 651,827

10 Claims. (Cl. 280—95)

This invention relates to a center link assembly for the steering linkages of dirigible vehicles.

Specifically, this invention deals with parallelogram steering linkages for automotive vehicles having independently suspended dirigible wheels.

In accordance with this invention, a steering linkage is provided with a single cross link swingably suspended from a pitman arm and an idler arm, and connected through independent tie rods to dirigible wheels. This link is shifted longitudinally by the pitman arm to propel the tie rods for simultaneously turning the wheels. Due to manufacturing errors and misalignment between the pitman arm and the idler arm, the joints connecting the cross link to these arms must accommodate varying amounts of angularity. However, if such joints take the form of conventional ball and socket type joints, the link is free to rotate on the ball studs and, since it is only suspended by these studs, it can, during operation of the vehicle, pound against the shanks of the studs to cause premature failure. In many installations, the plane of the pitman and idler arms is not parallel with the ground and the cross link is fastened to these arms in a transversely tilted position. In such instances, after the preliminary misalignment has been compensated for, the link will rotate around its ball centers until the neck or shank of the ball stud contacts the lip of the socket. Longitudinal shifting of the cross link to carry out its steering function will cause the socket lips to rub on the ball stud shanks or necks, and early failure will occur.

The present invention provides a further refinement in that one of the joint connections between the cross link and its supporting arm is adapted to universally tilt and rotate for accommodating misalignment of the arms due to manufacturing errors. However, the other joint is so formed that it will not accommodate tilting movements. This other joint is, therefore, effective to prevent transverse tilting of the cross link and to maintain the socket free of the shanks or necks of the studs in both joints.

In the preferred form of the invention, the joint connecting the pitman arm with the cross link is in the form of a joint accommodating universal tilting and rotating movements while the joint connecting the idler arm with the cross link is in the form of a joint accommodating rotative movements only.

It is, then, an object of this invention to provide a steering linkage of the cross link type wherein transverse rotation of the link is eliminated although misalignment of parts is accommodated.

Another object of this invention is to provide a cross link for steering assemblies which is directly supported at its opposite ends from pitman and idler arms and which is directly connected to independent tie rods, thereby eliminating heretofore-required drag links, center arms, and the like.

Another object of this invention is to provide a parallelogram type steering linkage for dirigible vehicles with a single cross link having direct joint connections to a pair of tie rods, an idler arm and a pitman arm.

A still further object of this invention is to provide a cross link for parallelogram type steering linkages with sockets for the head ends of a pair of studs and additional sockets for the shank ends of a pair of other studs.

Another object of the invention is to provide a cross link for a steering assembly with an integral ball joint socket, an integral tapered socket, and two integral shank-receiving sockets.

A still further object of the invention is to provide a one-piece cross link with a ball socket for receiving a pitman arm-suspended stud, a socket accommodating rotative movement only for receiving an idler arm-supported stud, and a pair of stud shank-receiving sockets in angularly displaced relation to the first mentioned sockets.

Other and further objects of this invention will be apparent to those skilled in the art from the following detailed description of the annexed sheet of drawings which, by way of a preferred example only, illustrates one embodiment of the invention.

On the drawings:

Figure 1 is a fragmentary top plan view of an automotive vehicle chassis equipped with independently suspended dirigible wheels and a steering linkage having a cross link according to this invention.

Figure 2 is an elevational view of the steering link of this invention, with parts shown in vertical cross section to illustrate the socket construction of the link and with fragmentary portions of tie rods connected to the link.

Figure 3 is a plan view of the cross link shown in Figure 2.

As shown on the drawings:

In Figure 1 the reference numeral 10 designates generally an automobile chassis having side frame beams 11, 11 and a cross beam 12. Wheel suspension arms 13, 13 are pivoted on the cross beam 12 and dirigible wheels 14, 14 are rotatably mounted on the spindles of steering knuckles 15, 15 pivoted through king pins 16, 16 on members carried by the arms 13, 13. The knuckles 15, 15 have steering arms 15a, 15a projecting rearwardly therefrom inwardly of the wheels 14. Tie rods 17, 17 have their outer ends connected to the steering arms 15a, 15a through ball and socket type tie rod joints designated generally at 18, 18. These tie rods 17, 17 extend inwardly and have inner ends 19 providing sockets for ball and socket type tie rod joints. These joints include studs having shanks 20 projecting from the sockets 19 as better shown in Figure 2.

In accordance with this invention a one-piece cross link 21 is mounted at one end on a pitman arm 22, and at the other end on an idler arm 23. The pitman arm 22 is secured on a rock shaft 24 projecting from a steering gear box B mounted on a frame beam 11. A steering column 25 extends into the box B and is connected through gearing (not shown) for oscillating the rock shaft 24 to swing the pitman arm 22 about the axis determined by the rock shaft. The pitman arm extends forwardly and downwardly from the gear box B at about the same angle as the steering column 25, viz., about 30° from the horizontal plane of the chassis. The forward lower end of the pitman arm 22 is provided with an eye 22a having a tapered bore therethrough.

The idler arm 23 is swingably suspended from a vertical pivot 26 carried by a bracket 27 on the frame beam 11 of the chassis opposite the beam carrying the gear box B. The pivot 26 is transversely aligned with the rock shaft 24 and the arms 22 and 23 are in spaced parallel relation and swingable on centers in transverse alignment with each other. The arm 23 extends forwardly and downwardly to an eye end 23a having a tapered bore therethrough.

As shown in Figure 2, the cross link 21 has a socket portion 28 thereon intermediate the ends thereof. This socket portion 28 is integral with the link and has a bottom bore 29 extending inwardly from one face of the link to the large end of a fragmental spherical bearing wall 30 which converges to a central aperture 31 in the top of the socket.

A stud 32 has a fragmental spherical head 33 in said socket engaging the wall 30 thereof. A cylindrical neck portion 34 of the stud extends freely through the aperture 31 of the socket. A cylindrically tapered portion 35 continues upwardly from the neck 34 and converges to a threaded end portion 36. The stud 32 thus has a fragmental spherical head in the socket 28 with an integral shank projecting from the socket through the aperture 31 thereof. The bore 29 is closed by a disk 37 spun into the open end of the bore. A coil spring 38 bottomed on the disk 37 urges a retainer 39 in the bore 29 toward the head 33 of the stud. The retainer 39 has a fragmental spherical recess 40 in the top wall thereof receiving a rounded button 41 projecting from the central portion of the bottom of the head 33 of the stud. The spring pressed retainer 39 holds the stud head 33 in tiltable and rotatable relation on the socket wall 30.

The tapered portion 35 of the stud shank snugly fits in the tapered bore of the eye end 22a of the pitman arm 22 and a nut 42 threaded on the end 36 of the stud pulls the tapered portion 35 of the stud into tight wedging engagement with the bore in the eye 22a.

As also shown in Figure 2, the cross link 21 has a second integral socket 43 formed thereon. This socket 43 has a bore 44 extending inwardly from one face of the link to a tapered bearing wall 45 which converges to an opening 46 through the other face of the link. A stud 47 has a frusto-conical head 48 disposed in the socket on the bearing wall 45 and has a shank projecting from the socket including a neck portion 49 freely movable in the opening 46, a tapered portion 50 above the neck 49, and a threaded end portion 51 at the converging end of the tapered portion 50.

The bore 44 is closed by a closure disk 52 which is spun into the socket in the open bottom of the bore. A coil spring 53 is bottomed on this closure disk 52 and urges a retainer 54 toward the stud 47. The retainer 54 has a rounded recess 55 receiving a rounded button end or projection 56 on the central portion of the bottom of the stud head 48.

The tapered portion 50 of the stud shank 47 is snugly seated in the tapered bore of the eye end 23a of the idler arm 23. A nut 57 threaded on the portion 51 of the stud acts on the eye 23a to draw the tapered shank portion 50 into tight wedging engagement in the bore of the eye.

It will be evident from Figure 2 of the drawings that the stud 32 can freely tilt and rotate in its socket 28 while the stud 47 can only rotate in its socket 43.

The link 21 has eye ends 58 in angular relation to the sockets 28 and 43. Since the pitman arm 22 and idler arm 23 are inclined at about a 30° angle from the horizontal plane of the chassis 10, the cross link 21 will be tilted at this same 30° angle. However, the socket ends 19 of the tie rod 17 are usually disposed in flat horizontal planes to carry the studs 20 in vertical planes when centered in the sockets. The eye ends 58 are therefore offset about 30° from the sockets 28 and 43. These eye ends 58 have tapered bores 59 therethrough receiving the tapered portions of the shanks of the studs 20 projecting from the tie rod sockets 19. The studs 20 have threaded upper ends 20a projecting through the eyes 58 and nuts 60 are threaded on these ends and are bottomed on the eyes to draw the tapered portions of the stud shanks into tight wedging engagement in the bores 59 of the eyes.

Since the stud 32 can tilt as well as rotate in the socket 28, it can be tilted as necessary to seat in the eye end 22a of the pitman arm 22. This tilting capacity of the stud 32 thereby accommodates manufacturing errors and misalignment of parts.

As explained above, the idler arm 23 is swung for movement in a single plane about the pivot 26 and its eye end 23a is fixedly connected to the stud 47. This stud 47, however, can only rotate in its socket 43 and the stud and idler arm 23 are thereby effective to hold the cross link 21 against rotation about its longitudinal axis, or transversely to its length. The construction thereby prevents oscillation of the cross link 21 about its longitudinal axis and the necks of the studs will not have rubbing engagement with their sockets. At the same time, free swinging of the cross link in a longitudinal direction is insured, because both sockets 28 and 43 of the cross link are free to rotate on the studs.

In view of the above descriptions it will be clear that this invention provides a one-piece cross link for parallelogram-type steering linkages which cannot rotate about its longitudinal axis and which forms a direct connection between tie rod joints and supporting arm joints.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A steering linkage for dirigible vehicles comprising a plurality of tie rods, a cross link connecting said tie rods, a pitman arm for actuating said cross link, an idler arm swingable with said pitman arm for supporting said cross link, joints connecting said arms with said cross link, one of said joints accommodating only rotative movements of the arm associated therewith about the axis of the joint and the other of said joints accommodating tilting and rotative movements of the arm associated therewith relative to the axis of the joint.

2. A steering linkage comprising a plurality of tie rods, sockets on said tie rods, studs projecting from said sockets, a cross link having apertures fixedly receiving aid studs therethrough, a pair of joint sockets integral with said cross link, one of said sockets accommodating rotative and tilting movements, the other of said sockets accommodating rotative movements only, studs projecting from the sockets of said cross link, a pitman arm fixedly connected to one of said studs, an idler arm fixedly connected to the other of said studs, and aligned fixed pivots supporting said arms for swinging movement in a single plane.

3. A steering linkage comprising an inclined steering gear box having a rock shaft projecting therefrom, a pitman arm parallel with said inclined gear box secured on said rock shaft for swinging movement therewith, an idler arm having a fixed pivot support in transverse spaced relation from said rock shaft and projecting forwardly from said fixed pivot at the same angle as the pitman arm, a cross link having joint sockets formed integrally therewith aligned with said pitman arm and said idler arm, studs projecting from said sockets and fixedly connected to said arms, one of said studs being tiltable and rotatable in its socket, the other of said studs being guided by the socket for rotation only therein, said cross link having eye ends angularly displaced from said integral joint sockets thereof, tie rods having joint sockets thereon, studs projecting from said tie rod sockets into said eye ends of the cross link, and means fixedly connecting said studs to said eye ends of the cross link.

4. In a steering linkage, a cross link comprising a one-piece rod having a pair of longitudinally spaced integral sockets formed therein, one of said sockets having a bearing wall accommodating limited universal movement, the other of said sockets having a bearing wall accommodating rotative movement only, a ball type stud seated in said one socket, a tapered stud seated in the other socket, said studs being secured at their shank ends in said linkage and means on said cross link for receiving additional studs.

5. In a steering linkage, a cross link comprising a one-piece rod having apertured eye ends and joint sockets intermediate said eye ends, said eye ends and said joint sockets being angularly displaced, a ball and socket type joint suspended from each eye end, a ball type stud in one socket having a shank projecting therefrom for rigid connection to the steering linkage and adapted to tilt and rotate relative to the rod, and a tapered stud in the other of said sockets having a shank projecting therefrom for rigid connection to the steering linkage and adapted to rotate only relative to said rod.

6. A steering linkage comprising a plurality of tie rods, a cross link connecting said tie rods, a pitman arm for actuating said cross link, an idler arm swingable with said pitman arm having one end in supporting engagement with said cross link, joints connecting said arms with said cross link, one of said joints having a stud guided for projection out of said joint and rigidly secured in one of said arms to prevent pivoting of said cross link about its longitudinal axis, the other of said joints having a stud guided for tilting and rotating movements in said other joint.

7. A steering linkage comprising a plurality of tie rods, a cross link connecting said tie rods, a pitman arm for actuating said cross link, an idler arm swingable with said pitman arm having one end in supporting engagement with said cross link, a joint connecting said pitman arm with said cross link including a ball type socket member for accommodating rotating and pivoting movements of a stud therein and a joint connecting said idler arm with said cross link including a socket having a tapered bearing surface and a stud with a tapered head rotatively journalling on said surface, said socket also having a straight wall portion and said stud having a straight shank portion guided thereby for holding the stud substantially perpendicular to said cross link.

8. A steering linkage comprising swingable steering arms, tie rods for said arms, a cross link, tie rod joints connecting said tie rods with said cross link, a pitman arm, an idler arm, aligned fixed pivots for said arms, and joints directly connecting said arms with said cross link, one of said joints having a stud projecting therefrom for rigid connection to one of said arms and arranged for rotative and limited universal movement relative to said cross link, the other of said joints having a stud guided for projection therefrom substantially perpendicular to said cross link and rigidly secured in one of said arms, to prevent said cross link from pivoting about its longitudinal axis.

9. In a steering linkage of the type wherein a pitman arm and an idler arm control the movement of a cross link, a cross link comprising a rod having eye ends for receiving the shank of studs of ball joints, a pair of joint sockets intermediate said eye ends and formed integral with said rods, one of said sockets having a tapered bearing surface for rotatively journalling the tapered head of a stud and a straight wall portion for guiding the shank of a stud for projection substantially perpendicular to said cross link, the other of said sockets having a ball type bearing surface for accommodating rotative and pivoting movement of a stud therein.

10. A steering mechanism comprising a plurality of tie rods, sockets on said tie rods, studs projecting from said sockets, a cross link having apertures fixedly receiving said studs therethrough, a joint socket integral with said cross link having a segmental spherical bearing surface therein, a stud having a ball head disposed in said socket on said bearing surface, a pitman arm fixedly connected to the shank of said stud, and means for preventing relative tilting movement of said stud and said socket after assembly of said steering mechanism.

ALBERT W. GAIR.

REFERENCES CITED

The following references are of record in the file of this patent:

UNITED STATES PATENTS

| Number | Name | Date |
|---|---|---|
| 2,072,203 | Fuller | Mar. 2, 1937 |
| 2,152,506 | Thorne | Mar. 28, 1939 |
| 2,215,243 | Klages | Sept. 17, 1940 |
| 2,369,091 | Venditty | Feb. 6, 1945 |